United States Patent
Tucholke et al.

(10) Patent No.: US 9,677,581 B2
(45) Date of Patent: Jun. 13, 2017

(54) CLOSURE DEVICE FOR CONNECTING TWO PARTS

(71) Applicant: Fidlock GmbH, Hannover (DE)

(72) Inventors: Artur Tucholke, Hannover (DE); Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 0 days.

(21) Appl. No.: 14/721,421

(22) Filed: May 26, 2015

(65) Prior Publication Data

US 2015/0337879 A1    Nov. 26, 2015

(30) Foreign Application Priority Data

May 26, 2014 (DE) .................. 10 2014 210 029

(51) Int. Cl.
*F16B 1/00* (2006.01)
*A44B 11/25* (2006.01)

(52) U.S. Cl.
CPC ............ *F16B 1/00* (2013.01); *A44B 11/2584* (2013.01); *A44B 11/2588* (2013.01); *A44D 2203/00* (2013.01); *F16B 2001/0035* (2013.01); *Y10T 24/32* (2015.01)

(58) Field of Classification Search
CPC ............... Y10T 24/32; Y10T 24/45251; Y10T 24/45183; Y10T 24/45188; Y10T 24/45194; Y10T 24/4522; Y10T 24/45173; Y10T 24/45215; Y10T 24/45225; Y10T 24/45241; A44D 2203/00; F16B 2201/0035; F16B 2001/0035; A44B 11/2584; A44B 11/2588
See application file for complete search history.

(56) References Cited

U.S. PATENT DOCUMENTS

| 348,288 A | 8/1886 | Macy et al. |
|---|---|---|
| 2,615,227 A | 10/1952 | Hornik |
| 3,799,610 A | 3/1974 | Hollins |
| 4,916,780 A * | 4/1990 | Ballet ............... A44B 11/2523 24/639 |
| 5,664,298 A | 9/1997 | Nessar-Ivanovic |
| 2002/0000024 A1 | 1/2002 | Grunberger |

(Continued)

FOREIGN PATENT DOCUMENTS

| DE | WO 2014090926 A1 * | 6/2014 | ......... A44B 11/2584 |
|---|---|---|---|
| FR | 2156162 A1 | 5/1973 | |

*Primary Examiner* — Robert J Sandy
*Assistant Examiner* — Michael Lee
(74) *Attorney, Agent, or Firm* — The Webb Law Firm (57) ABSTRACT

A closure device for connecting to parts with each other is provided. The closure device includes a first closure part which includes a first base body and a first form-fit portion stationarily arranged on the first base body, and a second closure part which includes a second base body and a second form-fit portion stationarily arranged on the second base body. For closing of the closure device the first closure part and the second closure part can be attached to each other, whereby the second form-fit portion of the second closure part can be brought in engagement with the first form-fit portion of the first closure part in a direction of engagement, so that in a closed position the form-fit portions positively are in engagement with each other. A recoil element is arranged on one of the closure parts and is elastically shiftable along the direction of engagement.

20 Claims, 9 Drawing Sheets

(56) References Cited

U.S. PATENT DOCUMENTS

| | | | |
|---|---|---|---|
| 2003/0229974 A1 | 12/2003 | Zemer et al. | |
| 2008/0110125 A1* | 5/2008 | Pervan | E04F 15/02 52/582.2 |
| 2014/0317890 A1* | 10/2014 | Koons | A42B 3/08 24/303 |
| 2016/0073744 A1* | 3/2016 | Fiedler | A44B 11/2588 24/303 |

* cited by examiner

CLOSURE DEVICE FOR CONNECTING TWO PARTS

CROSS-REFERENCE TO RELATED APPLICATIONS

This application claims priority to German Patent Application No. 10 2014 210 029.1 filed on May 26, 2014, the disclosure of which is hereby incorporated in its entirety by reference.

BACKGROUND OF THE INVENTION

This invention relates to a closure device for connecting two parts with each other.

Such closure device comprises a first closure part which includes a first base body and a first form-fit portion stationarily arranged on the first base body, and a second closure part which includes a second base body and a second form-fit portion stationarily arranged on the second base body. For closing the closure device, the first closure part and the second closure part are attachable to each other. The second form-fit portion of the second closure part thereby can be brought in engagement with the first form-fit portion of the first closure part in a direction of engagement, so that in a closed position the form-fit portions are positively in engagement with each other.

In a closure device known from U.S. Pat. No. 5,664,298 two closure parts are provided, which each include a form-fit portion. The form-fit portions can be brought in engagement with each other and, in a closed position of the closure device, are positively in engagement with each other. Two magnets are mounted on each closure part, in order to ensure that the closure parts cannot inadvertently be released from each other. The closure device known from U.S. Pat. No. 5,664,298 serves as closure for a piece of jewelry and is not designed for carrying great loads.

In a closure device for a piece of jewelry known from US 2003/0229974 A1 a first closure part can positively be brought in engagement with a second closure part, wherein in a closed position of the closure device the engagement is secured by magnets.

SUMMARY OF THE INVENTION

It is an object of the present invention to provide a closure device which can easily be closed and in a comfortable way be opened again and can provide a loadable closure for carrying great loads, as it is required for example for safety closures which must not open inadvertently even under great loads.

This object is solved by a subject-matter as described herein.

Accordingly, in the closure device a recoil element elastically shiftable along the direction of engagement additionally is arranged on one of the closure parts, which on attachment of the closure parts to each other is elastically movable out of a normal position, wherein on movement out of its normal position, the recoil element is formed to provide a force along the direction of engagement for supporting the engagement of the form-fit portions into each other.

In addition, there is provided a force introduction element pivotally arranged on the base body of the second closure part at a force introduction point in the vicinity of the second form-fit portion, which is formed to introduce a force into the second closure part.

The present closure device provides a closure which is designed highly loadable and accordingly also can be used for safety closures. The closure device can be designed purely mechanical. Optionally, magnetic elements can be provided to support the closing of the closure device, but are not absolutely required.

The engagement of the closure parts into each other on closing of the closure device is mechanically supported by the recoil element. On attachment of the closure parts to each other for closing the closure device, the recoil element is elastically deflected from its normal position and thus elastically tensioned. An elastic force between the closure parts thereby acts in direction of an engagement, so that the closing of the closure device is supported mechanically.

The second closure part is formed in a two-part form. The second closure part includes a base body which carries the form-fit portion. On the base body a force introduction element is pivotally arranged, which serves for introducing a force into the second closure part and hence effects a flux of force between the first closure part and the second closure part in the closed, loaded position of the closure device.

The force introduction element is pivotally arranged on the base body and for example can be formed as a strap extending around the base body, which is pivotable relative to the base body about a pivot axis realizing the force introduction point.

However, it likewise is conceivable that the force introduction element is formed as rope, belt, ribbon or as another flexible, for example pliable element which is pivotable relative to the base body at a pivot point, in that it for example exits from the base body at the pivot point or is movably mounted relative to the base body at the pivot point.

The force introduction element acts on the second closure part in the vicinity of the form-fit portion arranged on the base body of the second closure part. The force introduction into the second closure part thus is effected in the closed, loaded position of the closure directly in the vicinity of the form-fit portion and thus in the vicinity of the positive connection between the closure parts, which leads to the fact that the closure device can withstand high loads and even at great loads an—inadvertent—opening of the closure device does not occur independent of the swivel position of the force introduction element. The risk for an inadvertent opening of the closure device under load thereby is reduced.

The recoil element for example can be arranged on the first base body of the first closure part. However, it likewise is conceivable that the recoil element is arranged on the second base body of the second closure part. On whatever closure part the recoil element concretely is arranged, the recoil element is deflected out of its normal position and thus elastically tensioned, when the closure parts are attached to each other for closing the closure device, so that an elastic force acts in direction of the engagement between the closure parts.

The recoil element for example can be designed as mechanical slide. The recoil element for example can shiftably be arranged on the first base body of the first closure part along the direction of engagement and can elastically be pretensioned with respect to the first base body. In the normal position, the recoil element here is in an unloaded state. When the recoil element is deflected out of its normal position, a spring element via which the recoil element is pretensioned with respect to the base body for example is tensioned, so that a mechanical spring force acts in direction of the engagement of the closure parts.

It likewise is conceivable and possible that the recoil element is designed as slide shiftably arranged on the second base body of the second closure part along the direction of engagement. In this case, the recoil element can spring-mechanically be pretensioned with respect to the second base body of the second closure part in direction of the normal position by means of a suitable spring element.

Alternatively, the recoil element for example also can be formed on the first base body or the second base body as elastically resilient element, for example as latching lip or the like, which is elastically deflectable along the direction of engagement.

On the first base body of the first closure part a locking element preferably is arranged, which carries the first form-fit portion in the form of an undercut. In this case, the base body of the second closure part in the closed position advantageously comes to lie between the locking element and the recoil element arranged on the first base body of the first closure part, wherein in the closed position the recoil element can be tensioned elastically or can be in its normal position and thus in an unloaded state.

In the closed position, the base body preferably faces the locking element with a front side. Here, the distance of the force introduction point to the front side, as seen along the direction of engagement, preferably is less than one half, preferably less than one third, in particular less than one quarter of the distance between the locking element and the recoil element. Thus, the force introduction point is arranged with a comparatively small distance to the front side of the base body, with which the base body in the closed position of the closure device faces the locking element of the other, first closure part, and hence is located in the vicinity of the form-fit portion of the second closure part arranged on the base body, which likewise is arranged on the base body in the region of the front side and in the closed position of the closure device creates a form fit between the closure parts.

The force introduction point also can be arranged directly on the front side.

In an advantageous embodiment, the force introduction point is arranged on the base body such that, as seen along the direction of engagement, it overlaps with an undercut formed at the locking element or is arranged completely below the undercut, when the closure device is in its closed position. It thereby is achieved that a force can be introduced into the second closure part in an advantageous way, without such force introduction producing the risk of an inadvertent opening of the closure device under load.

In a concrete embodiment, the second base body for example includes a supporting element facing away from the second form-fit portion, which on closing of the closure device gets in contact with the recoil element arranged on the first base body. The supporting element can be designed as a portion protruding from the base body, which is arranged on a side of the base body facing away from the form-fit portion. The form-fit portion of the second base body and the supporting element thus are arranged on different sides of the second base body. On closing of the closure device, the second base body gets in contact with the recoil element via the supporting element, so that via the supporting element a pretensioning force is exerted on the second closure part to support the engagement of the second closure part into the first closure part.

Due to the fact that the second form-fit portion of the second base body and the supporting element of the second base body are arranged on different sides of the base body, a firm non-wobbling hold of the second closure part on the first closure part can be provided in the closed position via the second form-fit portion on the one hand and the supporting element on the other hand. In the closed position, the second base body with its supporting element advantageously is non-positively or positively held at the recoil element, so that the second base body is positively and/or non-positively fixed on the first closure part at two points via its second form-fit portion on the one hand and via the supporting element on the other hand, and thus a firm hold of the closure parts at each other is ensured in the closed position.

A non-positive connection between the recoil element and the supporting element of the second base body for example can be produced in that in the closed position of the closure device the recoil element rests against the supporting element of the second base body under tension. Due to this tension, a friction is provided between the supporting element of the second base body and the recoil element on the first base body, which can lead to a non-positive connection in the contact between the supporting element of the second base body and the recoil element of the first base body.

To produce a positive connection between the recoil element on the first base body of the first closure part and the second base body in the closed position, a fixing device in the form of a latching protrusion for example can be formed on the recoil element, with which the supporting element of the second base body positively is in engagement in the closed position. Via the latching protrusion, the second base body of the second closure part is held at the first closure part against a closing direction, in which the closure parts are to be attached to each other for closing the closure device, so that the second closure part cannot easily be removed from the first closure part against the closing direction, in any case not without eliminating the positive connection between the supporting element and the latching protrusion of the recoil element.

To eliminate the positive connection between the latching protrusion of the recoil element and the supporting element of the second base body of the second closure part for opening the closure device, it can be required for example that the recoil element is to be actuated against the direction of engagement, in order to release the two closure parts from each other.

Alternatively, it is also conceivable that the latching protrusion of the recoil element on the first closure part includes an oblique surface which is inclined obliquely to the closing direction in which the second closure part is to be attached to the first closure part for closing the closure device. Due to this oblique surface, onto which the second base body of the second closure part runs up with its supporting element on opening of the closure device, opening of the closure device can be made possible without having to separately actuate the recoil element for this purpose. By pulling the second closure part against the closing direction, it can thus be effected that the supporting element runs up onto the oblique surface and the recoil element thereby is shifted on the first base body of the first closure part against the direction of engagement, so that in this way the positive connection between the latching protrusion of the recoil element and the supporting element is eliminated automatically and the second closure part can be removed from the first closure part for opening the closure device.

To additionally secure the hold of the second closure part on the first closure part in the closed position of the closure device, a stationary blocking element additionally can be provided on the first base body of the first closure part, which in the closed position prevents that the second closure part can be shifted relative to the first closure part against the direction of engagement, in order to ensure in this way that the form-fit portions of the closure parts cannot undesirably get out of engagement. The blocking element can be arranged on the first base body of the first closure part such that in the closed position the second base body of the second closure part comes to lie between the locking element of the first closure part and the blocking element of the first closure part, wherein the second base body of the second closure part with a front side faces the locking element and with a rear side faces the blocking element. In the closed position, the blocking element thus prevents shifting of the second closure part relative to the first closure part against the direction of engagement, so that in the closed position the positive connection between the form-fit portions of the two closure parts cannot easily be eliminated.

Opening of the closure parts then is possible in principle by shifting the closure parts relative to each other in an opening direction transversely to the closing direction and transversely to the direction of engagement (tangentially to the form-fit portions) or by tilting the second closure part relative to the first closure part about a tilt axis defined by the form-fit portions.

The closure device of the type described here, as mentioned above, in principle can be designed as a purely mechanical closure device and in principle requires no magnetic elements which support closing of the closure device and/or in the closed position magnetically secure the hold of the closure parts at each other. Optionally, however, magnetic elements can be provided on the first closure part and the second closure part, which on closing of the closure device, i.e. on attachment of the closure parts to each other, oppose each other in a magnetically attracting manner and thus magnetically support closing of the closure device. The magnetic elements can be arranged on the base bodies of the closure parts, wherein it also is conceivable and possible to arrange one or more magnetic elements on the locking element or the recoil element of the first base body.

BRIEF DESCRIPTION OF THE DRAWINGS

The idea underlying the invention will be explained in detail below with reference to the exemplary embodiments illustrated in the Figures.

FIGS. 2A-8A show side views of the closure device on closing;

FIGS. 2B-8B show sectional views through the closure device on closing, in the positions according to FIGS. 2A-8A;

FIGS. 9A-13A show side views of the closure device during an alternative closing movement for closing the closure device; and FIGS. 9B-13B show sectional views of the closure device in the positions according to FIGS. 9A to 13A.

DETAILED DESCRIPTION OF THE INVENTION

Figure 1A:
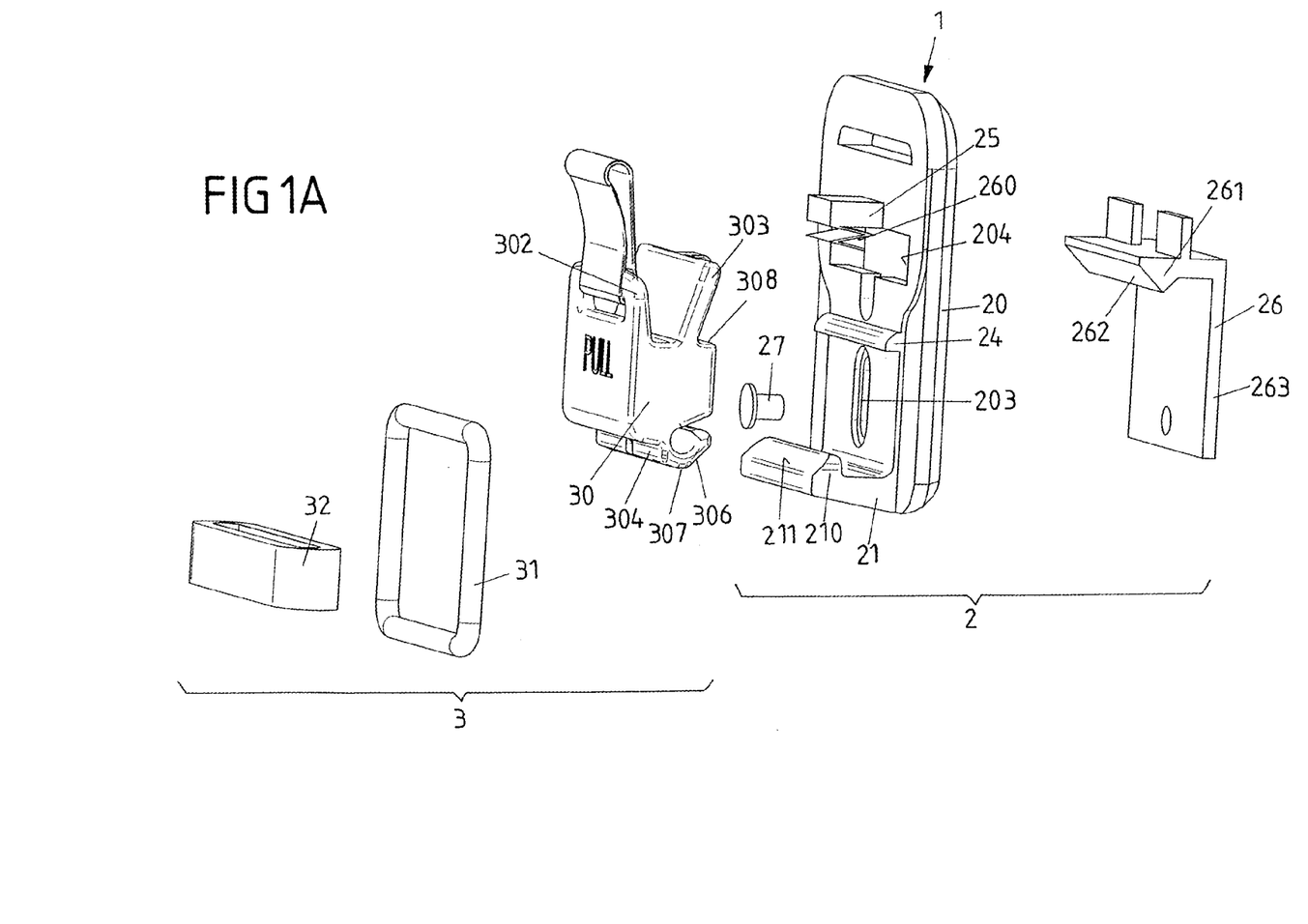
FIGS. 1A, 1B show perspective exploded views of an exemplary embodiment of a closure device with two closure parts.
Figure 1B:
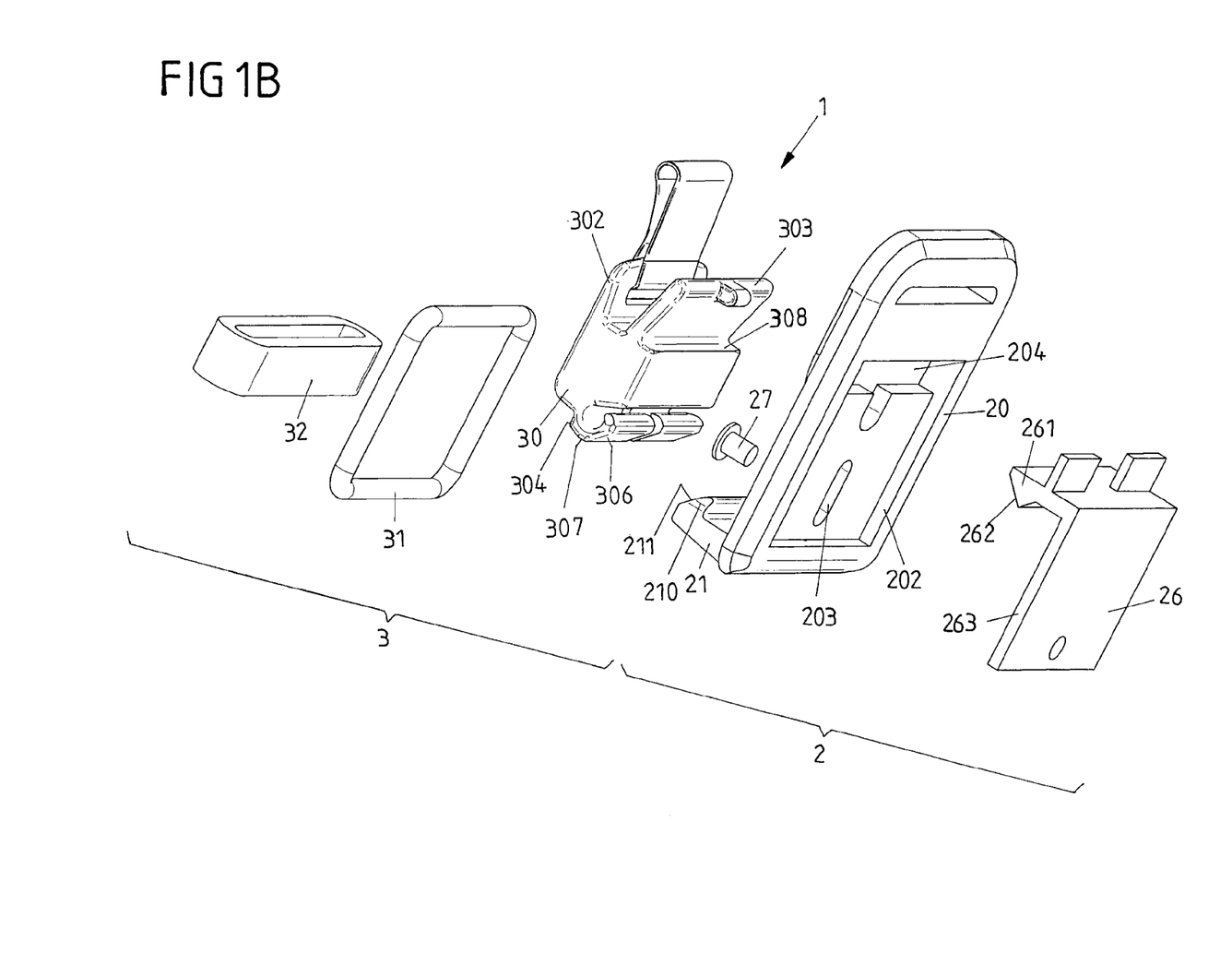

FIGS. 1A, 1B show a closure device 1 which for example serves for connecting two belt ends of two belts 4 with each other and can be designed as highly loadable closure, for example as safety closure.

The closure device 1 includes a first closure part 2 (so-called female part) and a second closure part 3 (so-called male part), which for closing of the closure device 1 can be attached to each other in a closing direction X and for opening of the closure device 1 can be released from each other.

The first closure part 2 includes a base body 20, at whose front end a locking element 21 with a form-fit portion 210 in the form of an undercut is arranged. The base body 20 substantially extends along a direction of engagement E and with the locking element 21 forms a receptacle into which the second closure part 3 with a form-fit portion 304 formed on a base body 30 can be pushed in a form-fitting manner in the direction of engagement E.

A recoil element 26 in the form of a slide is arranged shiftably along the direction of engagement E on the base body 20 of the first closure part 2, the slide being spring-elastically pretensioned via a spring element 260 with respect to an attachment piece 26 of the base body 20. The recoil element 26 rests in a receiving opening 202 with a guide portion 263 and in the receiving opening 202 is shiftably guided on the base body 20 along the direction of engagement E by engagement of a pin 27 fixed at the recoil element 26 into an oblong hole 203.

On a portion protruding from the base body 20, the recoil element 26 carries a latching protrusion 261 which forms a fixing device for fixing the second closure part 3 at the first closure part 2 in a closed position of the closure device 1, as will yet be explained below. The latching protrusion 261 reaches through an opening 204 in the base body 20.

Towards the side of the locking element 21 a blocking element 24 furthermore protrudes from the base body 20, which is stationarily formed on the base body 20.

On the base body 20 of the first closure part 2, a belt webbing receptacle 201 is formed for connecting a belt (not shown in the Figures).

The second closure part 3 includes a base body 30 with a form-fit portion 304 arranged thereon. To the base body 30, pivotable about a pivot axis 300, a force introduction element 31 in the form of a strap is articulated, at which a belt 4 can be fixed via a securing element 32. The pivot axis 300 of the force introduction element 31 here is arranged in the region of the form-fit portion 304, i.e. in the region of a front nose of the base body 30, which is advantageous for the force introduction into the second closure part 3 and in particular leads to the fact that due to an introduction of force into the base body 30 via the force introduction element 31 an unwanted opening of the closure device 1 under load cannot occur.

From the base body 30 a handle 302 extends, via which the second closure part 3 can be actuated for opening the closure device 1. From the base body 30 a supporting element 303 furthermore extends, which on closing of the closure device 1 interacts with the recoil element 26 and in the closed position of the closure device 1 is held at the recoil element 26, as will yet be explained below. The supporting element 303 extends towards a side of the base body 30 which faces away from the form-fit portion 304 of the base body 30, so that the supporting element 303 on the one hand and the form-fit portion 304 on the other hand are arranged on different sides of the base body 30.

Optionally, magnetic elements 23, 33 can be arranged on the closure parts 2, 3, which for example each can be designed as a (permanent) magnet or on the one hand as magnet and on the other hand as magnetic armature. When attaching the closure parts 2, 3 to each other for closing the closure device 1, the magnetic elements 23, 33 oppose each other in a magnetically attracting manner and in this way support the closing operation.

FIGS. 2A, 2B to 8A, 8B illustrate a closing operation of the closure device 1 in different positions on closing.

Figure 2A:
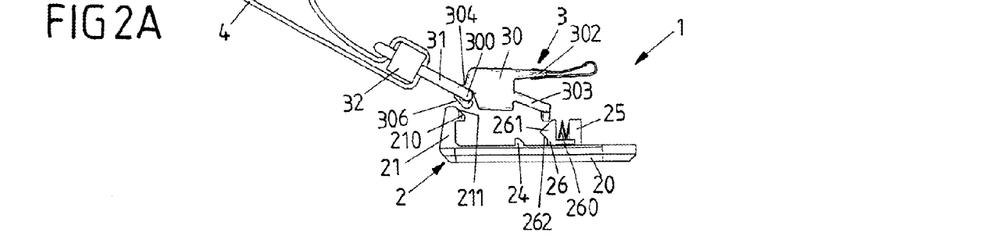
Figure 2B:
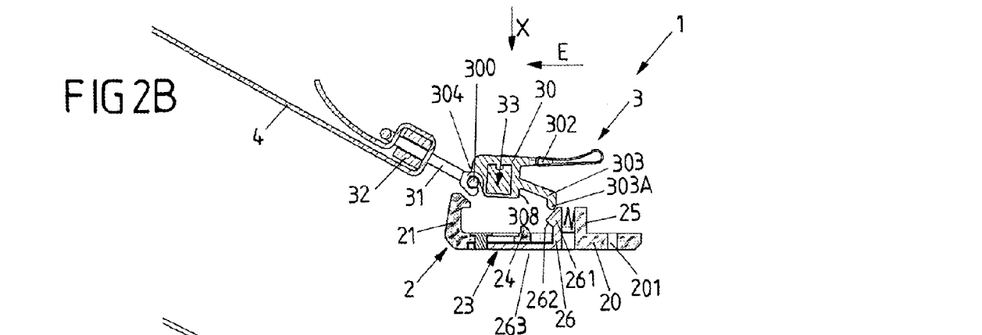
Figure 3A:
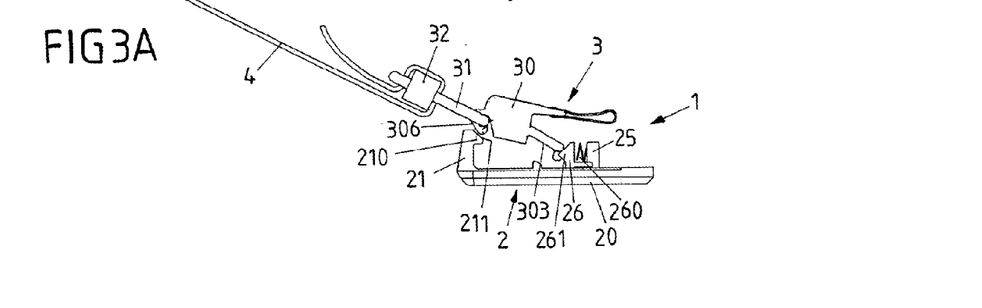
Figure 3B:
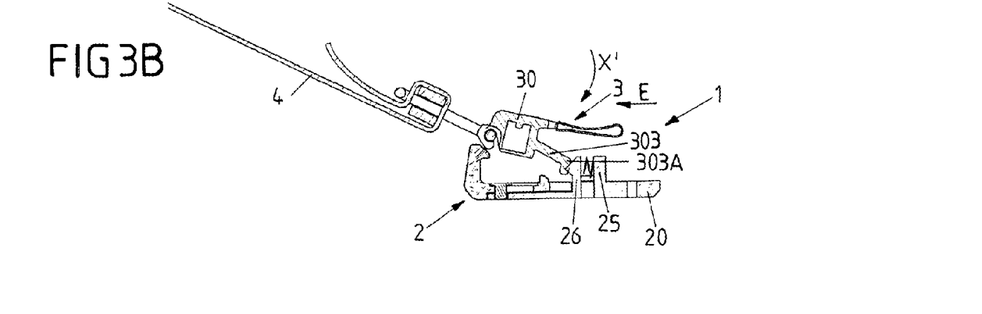

For closing the closure device 1, the second closure part 3 is attached to the first closure part 2 in a closing direction X, so that the base bodies 20, 30 of the closure parts 2, 3 can be approached to each other (FIGS. 2A, 2B). Oblique surfaces 211, 306 on the form-fit portion 210 of the locking element 21 of the first closure part 2 on the one hand and on the form-fit portion 304 of the second closure part 3 on the other hand initially get in contact with each other and run up onto each other, so that the second closure part 3 is tilted with respect to the first closure part 2 in a tilting direction X' (FIGS. 3A, 3B).

Figure 4A:
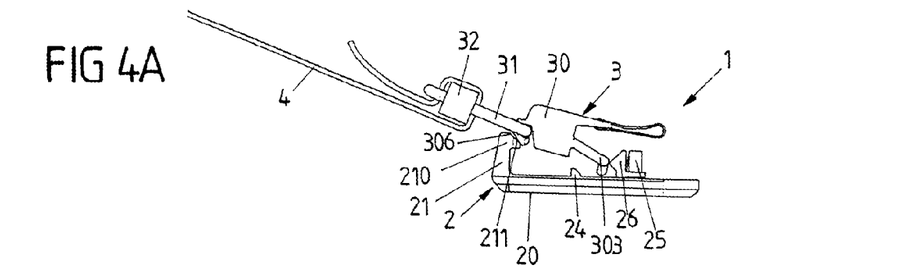
Figure 4B:
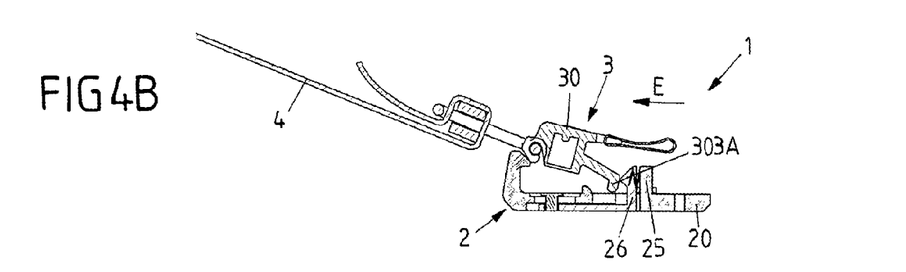

With an end 303A, the supporting element 303 gets in contact with the latching protrusion 261 of the recoil element 26, whereby the recoil element 26 is shifted with respect to the base body 20 against the direction of engagement E and the spring element 260 pretensioning the recoil element 26 thereby is tensioned (FIGS. 4A, 4B).

Figure 5A:
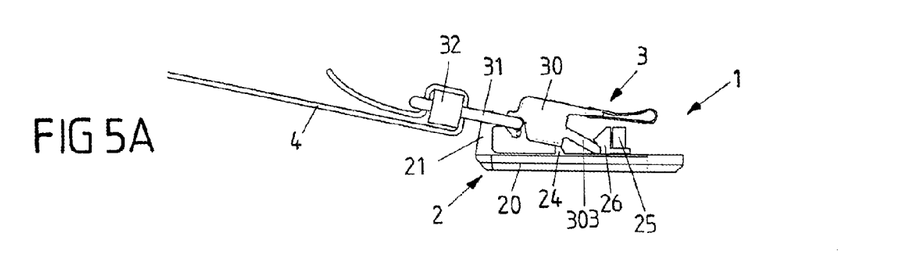
Figure 5B:
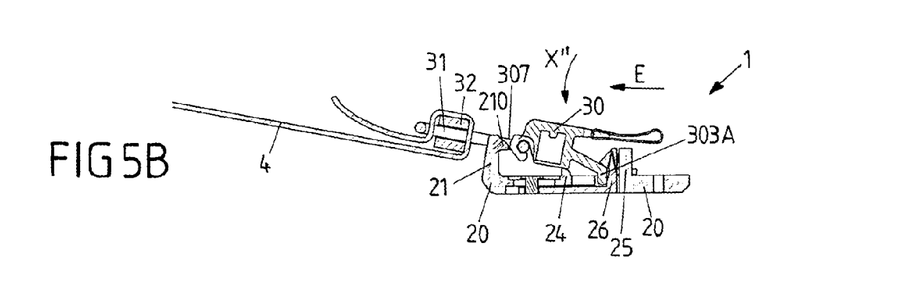

When the end 303A of the supporting element 303 gets in engagement with the latching protrusion 261 of the recoil element 26, the tilting direction X" is reversed (FIGS. 5A, 5B). When further approaching the closure parts 2, 3 to each other, the base body 30 of the second closure part 3 with its oblique surface 306 now slides along the oblique surface 211 on the locking element 21 of the first closure part 2, so that the front nose of the base body 30 of the second closure part 3 is moved past the form-fit portion 210 of the first closure part 2 (FIGS. 5A, 5B).

When the front nose of the base body 30 of the second closure part 3 has passed the form-fit portion 210 of the first closure part 2, the base body 30 of the second closure part 3 with its form-fit portion 304 is pushed into engagement with the form-fit portion 210 of the locking element 21 of the first closure part 2 in the direction of engagement E, in that due to the tension of the spring element 260 the recoil element 26 exerts a spring force on the second closure part 3 in the direction of engagement E.

In the closed position (FIGS. 6A, 6B) the base body 30 of the second closure part 3 faces the locking element 21 with a front side 307 and comes to lie between the locking element 21 and the recoil element 26, wherein by engagement with the latching protrusion 261 of the recoil element 26 the supporting element 303 is positively held at the base body 20 of the first closure part 2 against the closing direction X and thus a secure, non-wobbling hold of the closure parts 2, 3 at each other is ensured. In the closed position, the end 303A of the supporting element 303 comes to lie in a cutout provided for this purpose in the base body 20 of the first closure part 2 (FIG. 6B), so that the second closure part 3 neither can be shifted relative to the first closure part 2 along a transverse direction (transversely to the drawing plane).

Figure 6A:
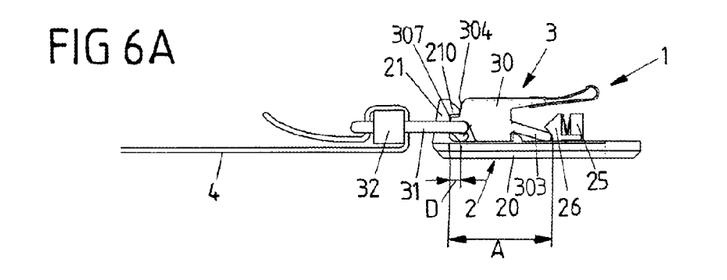
Figure 6B:
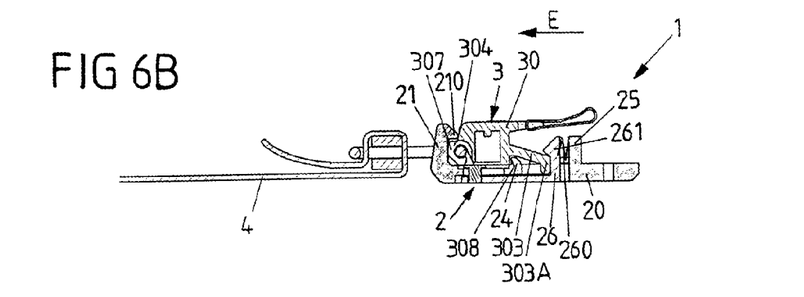

The non-wobbling hold of the closure parts 2, 3 at each other in particular is achieved in that the form-fit portion 304 and the supporting element 303 are arranged on the base body 30 of the second closure part 3 spaced from each other along the direction of engagement E. Via the form-fit portion 304 on the one hand and the supporting element 303 on the other hand, the second closure part 3 thus is positively held on the form-fit portion 210 on the one hand and on the latching protrusion 261 of the recoil element 26 on the other hand, so that a secure, reliable hold of the second closure part 3 on the first closure part 2 is obtained in the closed position of the closure device 1.

In the closed position, the spring element 260 (still) can be tensioned, so that the recoil element 26 rests against the supporting element 303 under tension and in this way a frictional force additionally acts between the supporting element 303 and the recoil element 26, which further improves the hold and fit of the second closure part 3 on the first closure part 2.

On closing of the closure device 1, the base body 30 of the second closure part 3 slides past the blocking element 24 stationarily arranged on the base body 20 with its bottom surface facing the base body 20 of the first closure part 2 (see FIGS. 5A, 5B and 6A, 6B), so that in the closed position the base body 30 of the second closure part 3 faces the blocking element 24 with a rear side 308. The base body 30 thus faces the locking element 21 with its front side 307 and the blocking element 24 with its rear side 308 and thus is accommodated between the locking element 21 and the blocking element 24. In the closed position, the blocking element 24 blocks a (direct) movement of the second closure part 3 against the direction of engagement E, so that the second closure part 3 cannot easily be pushed out of engagement with the first closure part 2 against the direction of engagement E.

In the illustrated exemplary embodiment the force introduction element 31 is formed by a strap which is pivotally arranged on the base body 30 of the second closure part 3 about a pivot axis 300. The pivot axis 300 here realizes a force introduction point at which a force is introduced into the second closure part 3, when the closure device 1 is loaded in its closed position, so that a flux of force is produced between the closure parts 2, 3.

The force introduction point in the form of the pivot axis 300 is arranged at the front end directly in the region of the front side 307 of the base body 30 of the second closure part 3 and hence is located below the form-fit portion 304 at the base body 30 (as seen in closing direction X). The distance D (see FIG. 6A) of the force introduction point 300 to the front side 307 here is distinctly smaller than the distance A between the front side 307 and the recoil element 26, preferably less than one half, more preferably less than one third, for example less than one quarter, or even less than one tenth of the distance A.

Due to the fact that the force introduction point in the form of the pivot axis 300 is arranged on the base body 30 directly in the region of the front side 307, a force is introduced between the closure parts 2, 3 directly in the region of the positive connection produced between the locking element 21 and the base body 30 in the closed, loaded position of the closure device 1. Independent of the swivel position of the force introduction element 31 relative to the base body 30, an (inadvertent) opening under load by a force acting on the force introduction element 31 hence cannot occur. The forces introduced via the force introduction element 31 are absorbed and dissipated in a positive way via the locking element 21, so that an advantageous flux of force is produced between the closure parts 2, 3.

In this connection it should be noted that the force introduction element 31 in principle also can be formed as rope, ribbon, belt or other flexible, for example pliable element. In this case, the force introduction point for example is formed by the exit point of the force introduction element from the base body 30 or by a fastening point at which the force introduction element is attached to the base body 30.

Figure 7A:
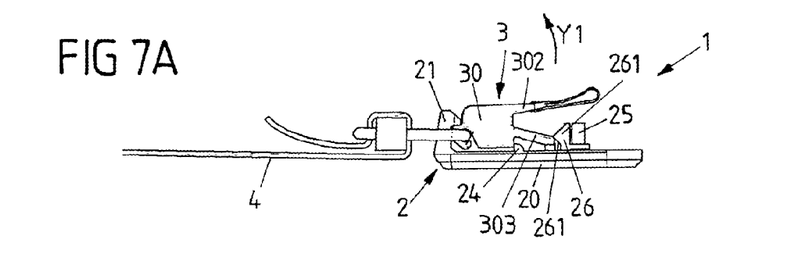
Figure 7B:
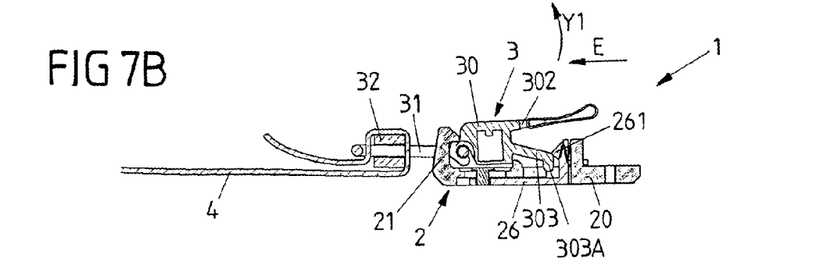
Figure 8A:
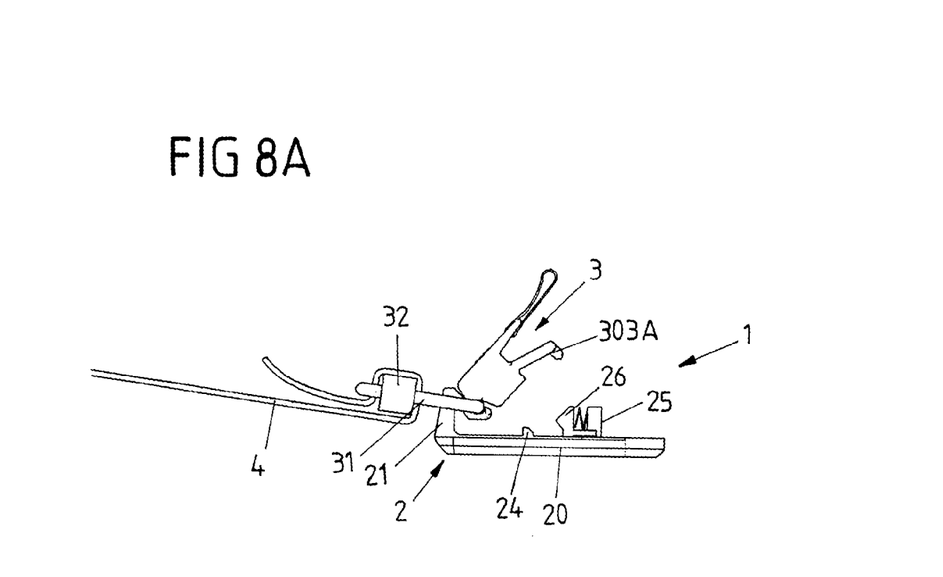
Figure 8B:
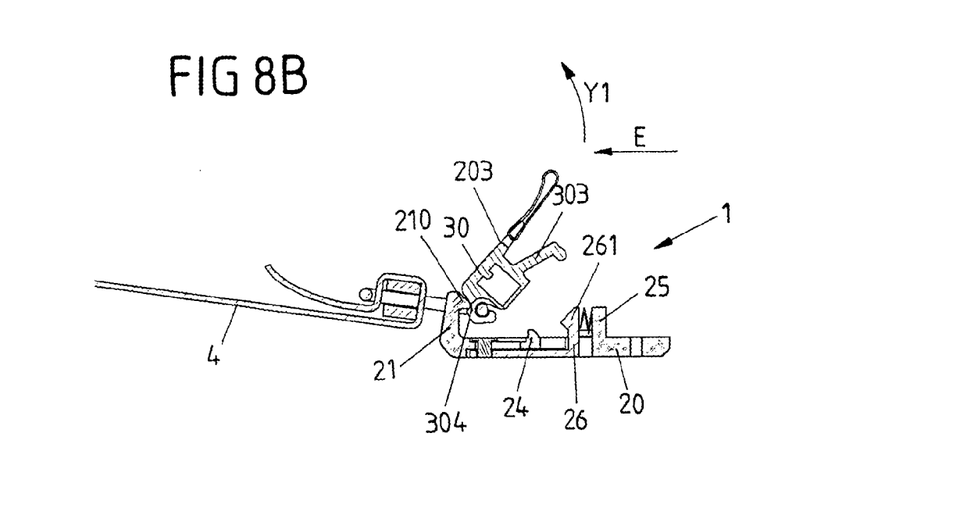
Figure 9A:
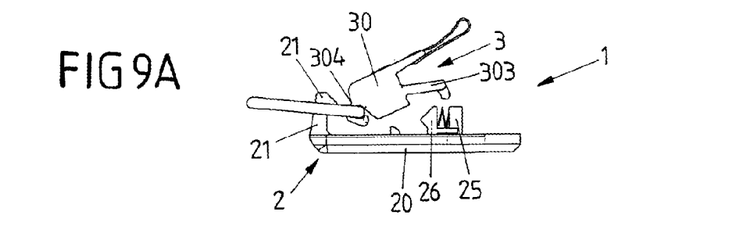
Figure 9B:
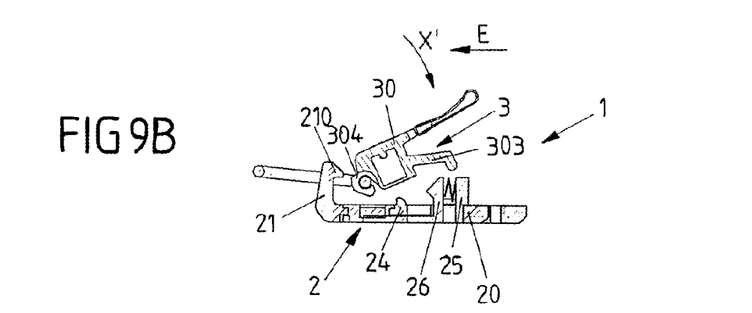
Figure 10A:
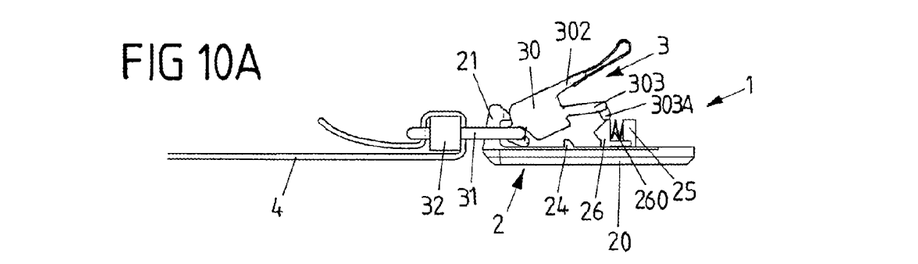
Figure 10B:
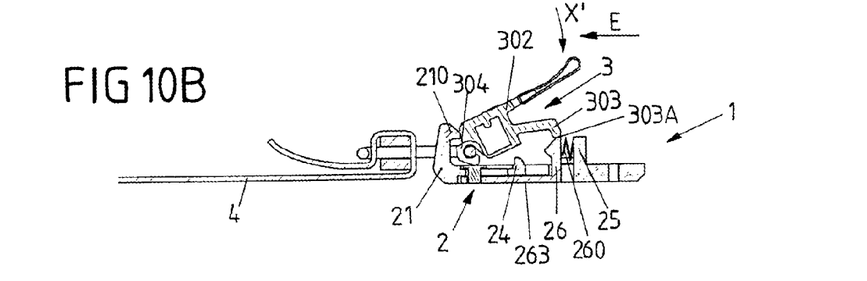
Figure 11A:
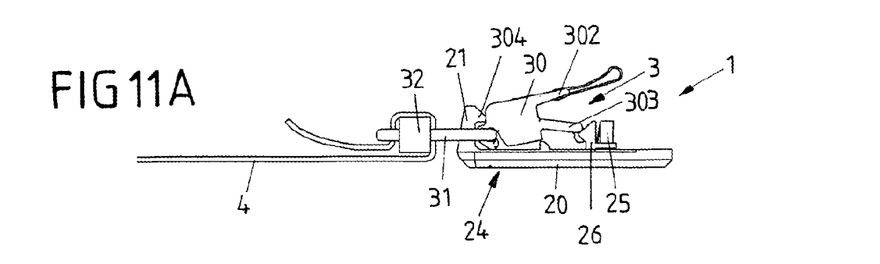
Figure 11B:
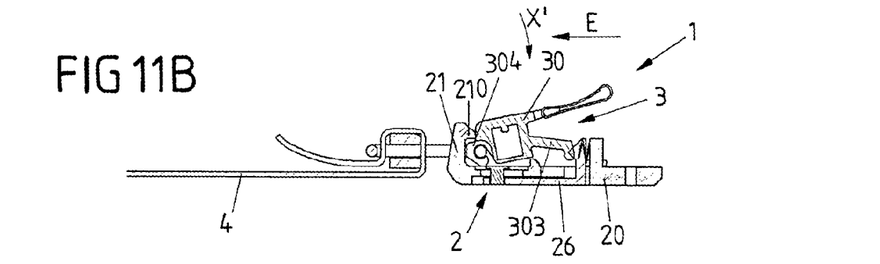
Figure 12A:
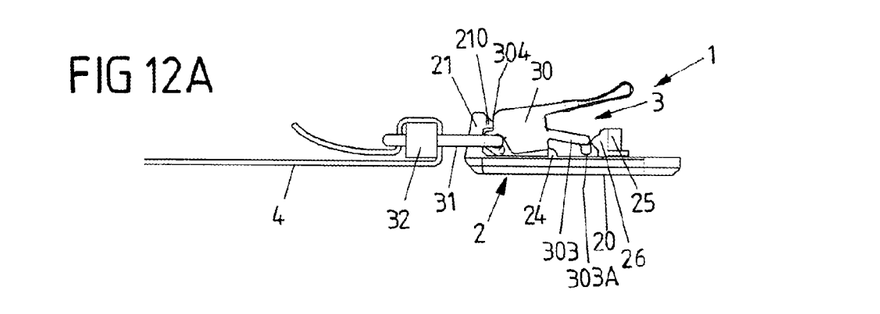
Figure 12B:
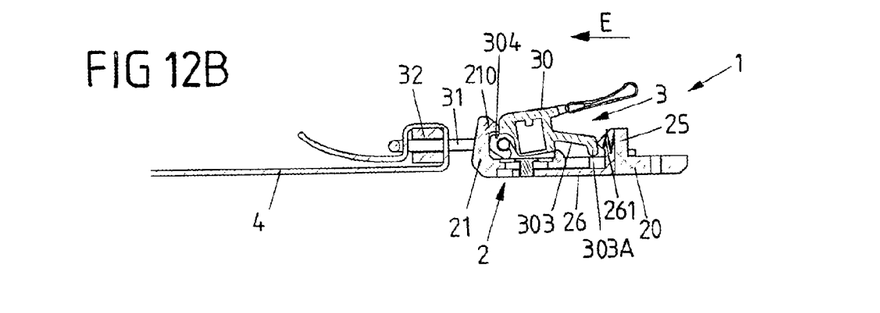

For opening, a user can grasp the handle 302 of the second closure part 3, as shown in FIGS. 7A, 7B, and tilt the second closure part 3 relative to the first closure part 1 in an opening direction Y1, wherein a tilt axis is provided by the positive engagement of the form-fit portions 210, 304. On tilting, the supporting element 303 on the base body 30 of the second closure part 3 runs up onto an oblique surface 262 of the latching protrusion 261, so that the recoil element 26 is shifted relative to the base body 20 against the direction of engagement E and the positive connection between the supporting element 303 and the recoil element 26 is eliminated (FIGS. 7A, 7B). By tilting further in the opening direction Y1, the second closure part 3 thus can be brought out of engagement with the first closure part 2, so as to release the closure parts 2, 3 from each other (FIGS. 8A, 8B).

During the closing operation according to FIGS. 2A, 2B to 6A, 6B the supporting element 303 initially gets into engagement with the recoil element 26, and then the engagement between the form-fit portions 210, 304 of the closure parts 2, 3 is produced. In principle, this order can however also be reversed, as shown for the closing operation according to FIGS. 9A, 9B to 13A, 13B, in that first of all the engagement between the form-fit portions 210, 304 and then the engagement between the supporting element 303 and the recoil element 26 is produced.

Figure 13A:
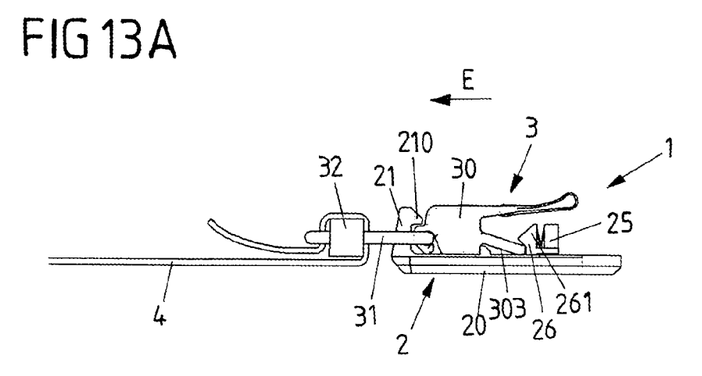
Figure 13B:
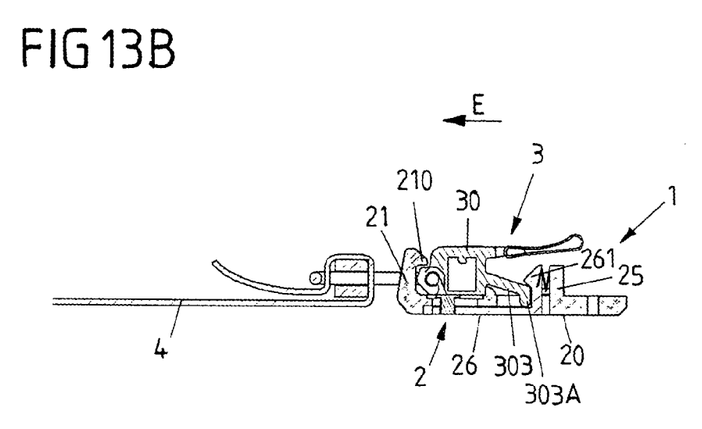

During the closing operation according to FIGS. 9A, 9B to 13A, 13B the engagement between the form-fit portions 210, 304 of the closure parts 2, 3 initially is produced by attaching the base body 30 of the second closure part 3 with its form-fit portion 304 to the locking element 21 of the first closure part 2 (FIGS. 9A, 9B and 10A, 10B). The second closure part 3 then is tilted relative to the first closure part 2, so that the supporting element 303 with its end 303A gets in contact with the latching protrusion 261 of the recoil element 26 and shifts the same relative to the base body of the first closure part 2 against the direction of engagement E (FIGS. 11A, 11B). The spring element 260, which pretensions the recoil element 26 with respect to the attachment piece 25 of the base body 20 of the first closure part 2, thereby is tensioned (FIGS. 12A, 12B). When the end 303A of the supporting element 303 has been moved past the latching protrusion 261 of the recoil element 26, the recoil element 26 is moved back into the direction of engagement E due to the spring force of the spring element 260, so that a positive engagement between the latching protrusion 261 of the recoil element 26 and the end 303A of the supporting element 303 is produced and in this way the second closure part 3 at its front end via the form-fit portion 304 and at its rear end via the supporting element 303 is held at the first closure part 2 in a non-wobbling manner (FIGS. 13A, 13B).

The closed position according to FIGS. 13A, 13B here corresponds to the closed position according to FIGS. 6A, 6B, which also is achieved in the closing operation described above.

Opening is effected in the same way as described above with reference to FIGS. 7A, 7B and 8A, 8B.

The idea underlying the invention is not limited to the exemplary embodiments described above, but can also be realized in principle in a completely different way.

For example, a recoil element as described here need not necessarily be provided on the first closure part, but can also be arranged on the second closure part. A shiftable slide, which is tensioned on attachment of the closure parts to each other, can also be arranged on the base body of the second closure part.

In addition, the recoil element is not necessarily designed in the form of a slide, but for example can also be realized by an inherently elastic element, for example a latching lip or an element otherwise elastically deformable along the direction of engagement.

A tilt fixation on the recoil element is not necessarily formed by a latching protrusion, as described above, but can also be realized in some other way.

For example, a tilt fixation also can be realized by providing a pushbutton, which is elastically shiftable relative to the recoil element along the direction of engagement. For example, a tilt fixation can be realized by an elastically shiftable wire which in the closed position produces a form fit.

Alternatively, there can also be provided a plug which in the closed position fixingly acts for example on the supporting element of the second closure part.

Or a press fit can be produced between the recoil element and the associated closure part, so that a form fit for fixing purposes can completely be omitted.

Alternatively, an engagement between elastic materials, such as an engagement of a rubber plug into a non-elastically designed hole or an engagement of a non-elastic plug into an elastically designed hole also can be provided for tilt fixation.

When a latching protrusion is provided on the recoil element, the same need not necessarily have an oblique surface onto which the supporting element automatically runs up on opening and by means of which the recoil element thus is shifted without separate actuation. The latching protrusion for example also can realize an undercut with an at least approximately right angle, so that for opening the closure device a separate actuation of the recoil element is required for releasing the fixation.

LIST OF REFERENCE NUMERALS

1 closure device
2 closure part
20 base body
201 belt webbing receptacle
202 receiving opening
203 oblong hole
204 opening
21 locking element
210 form-fit portion
211 oblique surface
23 magnetic element
24 blocking element
25 attachment piece
26 recoil element
260 spring element
261 fixing device
262 oblique surface
263 guide portion
27 pin
3 closure part
30 base body
300 pivot axis
302 handle
303 supporting element
303A end
304 form-fit portion
306 oblique surface
307 front side
308 rear side
31 force introduction element
32 securing element
33 magnetic element
4 belt webbing
A distance
D distance E direction of engagement
X closing direction
X', X" swivel movement
Y1 opening direction

The invention claimed is:

1. A closure device for connecting two parts with each other, comprising:
a first closure part which includes a first base body and a first form-fit portion stationarily arranged on the first base body,
a second closure part which includes a second base body and a second form-fit portion stationarily arranged on the second base body, wherein for closing of the closure device the first closure part and the second closure part are attachable to each other, the second form-fit portion of the second closure part thereby can be brought in engagement with the first form-fit portion of the first closure part in a direction of engagement, and in a closed position the form-fit portions positively are in engagement with each other,
wherein a recoil element arranged on one of the closure parts and elastically adjustable along the direction of engagement, which on attachment of the closure parts to each other is elastically movable out of a normal position, wherein on movement out of its normal position, the recoil element is formed to provide a force along the direction of engagement for supporting the engagement of the form-fit portions into each other, and
a force introduction element pivotally arranged on the base body of the second closure part at a force introduction point on the second form-fit portion, which is formed to introduce a force into the second closure part.

2. The closure device according to claim 1, wherein the force introduction element is formed as a strap pivotally arranged on the base body of the second closure part about a pivot axis or as a rope element, ribbon element or belt element pivotable about a pivot point relative to the base body.

3. The closure device according to claim 1, wherein the recoil element is arranged on the first base body of the first closure par.

4. The closure device according to claim 1, wherein the recoil element is formed as a slide shiftably arranged on the first base body along the direction of engagement, which is elastically pretensioned with respect to the first base body.

5. The closure device according to claim 1, wherein on the first base body a locking element is arranged, which carries the first form-fit portion.

6. The closure device according to claim 5, wherein in the closed position the second closure part comes to lie between the locking element and the recoil element with its second base body.

7. The closure device according to claim 5, wherein in the closed position the second base body faces the locking element with a front side, wherein the distance of the force introduction point to the front side, as seen along the direction of engagement, is less than one half, of the distance between the locking element and the recoil element.

8. The closure device according to claim 7, wherein in the closed position the second base body faces the locking element with a front side, wherein the distance of the force introduction point to the front side, as seen along the direction of engagement, is less than one third of the distance between the locking element and the recoil element.

9. The closure device according to claim 7, wherein in the closed position the second base body faces the locking element with a front side, wherein the distance of the force introduction point to the front side, as seen along the direction of engagement, is less than one quarter of the distance between the locking element and the recoil element.

10. The closure device according to claim 1, wherein the second base body includes a supporting element facing away from the second form-fit portion, which on closing of the closure device gets in contact with the recoil element.

11. The closure device according to claim 1, wherein in the closed position the second base body is positively held at the recoil element.

12. The closure device according to claim 1, wherein the recoil element includes a fixing device with which the second base body is in engagement in the closed position.

13. The closure device according to claim 12, wherein the fixing device is formed by a latching protrusion which in the closed position positively is in engagement with the second closure part.

14. The closure device according to claim 13, wherein the latching protrusion includes an oblique surface which is inclined obliquely to a closing direction in which the second closure part is attachable to the first closure part for closing of the closure device and onto which the supporting element runs up on opening of the closure device and thereby shifts the recoil element against the direction of engagement.

15. The closure device according to claim 1, wherein an additional blocking element is stationarily arranged on the first base body such that in the closed position the second base body faces the first form-fit portion with the second form-fit portion and the blocking element with a rear side facing away from the second form-fit portion.

16. The closure device according to claim 1, wherein on the first closure part and on the second closure part at least one magnetic element each is arranged, which on attachment of the closure parts to each other magnetically attract each other.

17. A closure device for connecting two parts with each other, comprising:
a first closure part which includes a first base body and a first form-fit portion stationarily arranged on the first base body,
a second closure part which includes a second base body and a second form-fit portion stationarily arranged on the second base body, wherein for closing of the closure device the first closure part and the second closure part are attachable to each other, the second form-fit portion of the second closure part thereby can be brought in engagement with the first form-fit portion of the first closure part in a direction of engagement, and in a closed position the form-fit portions positively are in engagement with each other,
a recoil element arranged on one of the closure parts and elastically adjustable along the direction of engagement, which on attachment of the closure parts to each other is elastically movable out of a normal position, wherein on movement out of its normal position, the recoil element is formed to provide a force along the direction of engagement for supporting the engagement of the form-fit portions into each other, and
a force introduction element pivotally arranged on the base body of the second closure part at a force introduction point in the vicinity of the second form-fit portion, which is formed to introduce a force into the second closure part,
wherein on the first base body a locking element is arranged, which carries the first form-fit portion, and
wherein in the closed position the second base body faces the locking element with a front side, wherein the distance of the force introduction point to the front side, as seen along the direction of engagement, is less than one half of the distance between the locking element and the recoil element.

18. The closure device according to claim 17, wherein in the closed position the second base body faces the locking element with a front side, wherein the distance of the force introduction point to the front side, as seen along the direction of engagement, is less than one third of the distance between the locking element and the recoil element.

19. The closure device according to claim 17, wherein in the closed position the second base body faces the locking element with a front side, wherein the distance of the force introduction point to the front side, as seen along the direction of engagement, is less than one quarter of the distance between the locking element and the recoil element.

20. A closure device for connecting two parts with each other, comprising:
- a first closure part which includes a first base body and a first form-fit portion stationarily arranged on the first base body,
- a second closure part which includes a second base body and a second form-fit portion stationarily arranged on the second base body, wherein for closing of the closure device the first closure part and the second closure part are attachable to each other, the second form-fit portion of the second closure part thereby can be brought in engagement with the first form-fit portion of the first closure part in a direction of engagement, and in a closed position the form-fit portions positively are in engagement with each other,
- a recoil element arranged on one of the closure parts and elastically adjustable along the direction of engagement, which on attachment of the closure parts to each other is elastically movable out of a normal position, wherein on movement out of its normal position, the recoil element is formed to provide a force along the direction of engagement for supporting the engagement of the form-fit portions into each other, and
- a force introduction element pivotally arranged on the base body of the second closure part at a force introduction point in the vicinity of the second form-fit portion, which is formed to introduce a force into the second closure part,
wherein on the first closure part and on the second closure part at least one magnetic element each is arranged, which on attachment of the closure parts to each other magnetically attract each other.

\* \* \* \* \*

UNITED STATES PATENT AND TRADEMARK OFFICE
CERTIFICATE OF CORRECTION

PATENT NO. : 9,677,581 B2
APPLICATION NO. : 14/721421
DATED : June 13, 2017
INVENTOR(S) : Artur Tucholke et al.

It is certified that error appears in the above-identified patent and that said Letters Patent is hereby corrected as shown below:

In the Claims

Column 11, Line 57, Claim 7, delete "half," and insert -- half --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*